J. F. HALL.
Flat-Iron Heaters.

No. 144,335. Patented Nov. 4, 1873.

Witnesses.
A. Ruppert

J. F. Hall
Inventor.

UNITED STATES PATENT OFFICE.

JOHN F. HALL, OF ALBIA, IOWA.

IMPROVEMENT IN FLAT-IRON HEATERS.

Specification forming part of Letters Patent No. 144,335, dated November 4, 1873; application filed October 11, 1873.

*To all whom it may concern:*

Be it known that I, JOHN F. HALL, of Albia, in the county of Monroe and State of Iowa, have invented a certain Improvement in Sad-Iron Heaters, of which the following is a specification:

This invention relates to a device which is to be used upon a stove or any other heating apparatus having apertures in its upper surface for its reception; and it consists in the construction and combination of certain of its parts, as will be more fully set forth hereinafter.

Figure 1:
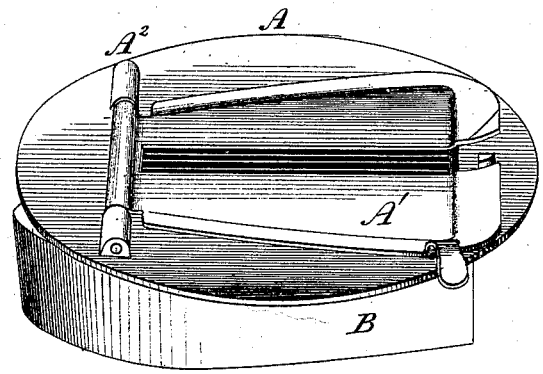
Figure 2:
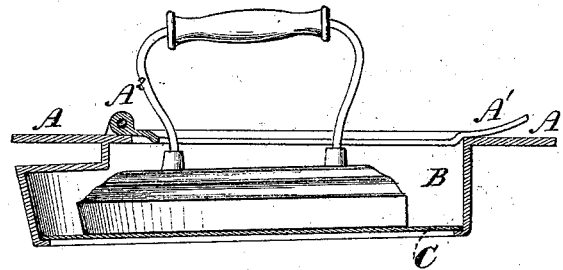

Figure 1 is a perspective view of my improved heater, showing the part which forms the cover to the aperture in the stove, a swinging lid, and the receptacle for the sad-iron. Fig. 2 is a longitudinal sectional elevation, showing the parts above alluded to with an iron in position.

Like parts are designated by corresponding letters in both figures.

In constructing devices of this character I employ a plate, A, of cast-iron or other suitable material, it being of such form and size as to cause it to fit in or cover the aperture in the stove or other apparatus to which it is to be applied. This plate has an aperture formed in it sufficiently large to permit one or more sad-irons to be passed through it, said aperture being covered with a swinging cover, A', which is hinged thereto, as shown at A². This cover has a slot formed in it, into which the handle of the sad-iron can be slid, so that the cover may be closed down when the iron is being heated, and thus prevent to some extent the radiation of the heat therefrom. Upon the under surface of plate A there is formed a downwardly-projecting chamber, B, which is composed of walls placed vertically and of such form as to receive one or more irons, there being partitions formed between the chambers when more than one are used. These walls, or this downwardly-projecting flange, is constructed as shown in Fig. 2, where there is shown a ledge projecting inward, upon which the loose bottom C rests. This loose bottom is preferably made of copper, as that is a better conductor of heat than either cast or wrought iron; and it is made removable, in order that under certain circumstances it may be removed and the irons be allowed to fall down until the broader portions of their handles shall rest upon the slotted cover for the purpose of bringing the lower surfaces nearer to the fire, and thus save time in heating them. This feature of the device is regarded as of importance, as it frequently happens that toward the close of an ironing the fire gets lower, and as a consequence the time required to heat the irons is comparatively great, which inconvenience is remedied by taking out the removable bottom, and allowing the portions of the iron to be heated to come more nearly in contact with the coals in the stove, as above referred to.

What I claim as my invention, and desire to secure by Letters Patent, is—

1. The removable bottom C, when used in connection with a sad-iron heater, substantially as set forth.

2. The combination, in a sad-iron heater, of the plate A, slotted swinging cover A', chamber B, and removable bottom C, the parts being arranged substantially as and for the purpose set forth.

In testimony whereof I have signed my name to this specification in the presence of two subscribing witnesses.

JOHN F. HALL.

Witnesses:
 CASPAR DURR,
 BENJ. HOLLAND.